United States Patent [19]

Salter

[11] 4,238,102
[45] Dec. 9, 1980

[54] SPRING SUPPORTS

[75] Inventor: Colin J. Salter, Warley, England

[73] Assignees: Anthony John Salter; Yvonne Diane Salter, both of Droitwich, England

[21] Appl. No.: 867,590

[22] Filed: Jan. 6, 1978

[51] Int. Cl.³ ............................................. F16M 13/00
[52] U.S. Cl. ................................... 248/543; 248/561; 248/612; 248/613
[58] Field of Search ............... 248/542, 543, 561, 612, 248/613; 277/105, 106

[56] References Cited

U.S. PATENT DOCUMENTS

| 1,726,244 | 8/1929 | Shefstead | 248/613 X |
| 1,757,311 | 5/1930 | Kahle | 277/106 X |
| 2,159,870 | 5/1939 | Wert | 248/613 X |
| 2,689,145 | 9/1954 | Magos et al. | 277/105 |
| 2,713,982 | 7/1955 | Sherbrooke | 248/542 |
| 2,979,297 | 4/1961 | Suozzo | 248/542 |
| 3,102,706 | 9/1963 | Goldsmith | 248/613 X |
| 3,637,174 | 1/1972 | Kuo | 248/613 X |
| 4,026,507 | 5/1977 | Thiedemann | 248/543 X |

FOREIGN PATENT DOCUMENTS 1229875  4/1971  United Kingdom ..................... 248/561

Primary Examiner—Wm. Schultz
Attorney, Agent, or Firm—Scrivener, Parker, Scrivener and Clarke

[57] ABSTRACT

A spring support particularly intended for supporting pipes in installations where the pipes are liable to move laterally while in use, as for example in the case of pipes through which steam is conveyed, has provision for locking its compression spring means against movement relative to a body of the spring support in a plurality of positions longitudinally of the axis of operating movement of the spring. Preferably the spring means can be locked in an infinite number of positions within the operating range of its longitudinal movement. Thus if for any reason it is desired to resist movement for a while of a pipe which is supported by the spring support during use, the spring means can be readily locked against movement in the operative position it was occupying, without first having to move the spring means to another position before the spring means may be locked.

14 Claims, 5 Drawing Figures

SPRING SUPPORTS

This invention relates to spring supports of the kind suitable for supporting pipes which are subject to movement in use caused, for example, by variations in temperature. Pipes for conveying steam are usually supported by such spring supports.

In general, spring supports of the kind set forth operate with either a constant supporting spring force or a variable supporting spring force. The spring force in the former type of spring support remains substantially constant for a range of movement of a pipe supported by the spring support in use, whereas in the latter type the spring force varies according to the movement of the pipe. The present invention is applicable to both types of spring support.

There are occasions when it is necessary or desirable to lock the spring means of a spring support against movement. Such an occasion may be, for example, when the interior of a pipe supported by the spring support is to be cleansed by passing cleansing fluid through it, or when an hydraulic test is to be carried out in which the pipe is filled with fluid under pressure. Locking the spring means prevents it from being subjected to excessive stresses under loads applied to the spring support which may be outside the normal working range of the spring means.

In previously proposed spring supports which have had provision for locking the spring means against movement, the spring means could be locked in one position only. Getting the spring means to the position for it to be locked can be a difficult operation, and furthermore the application of the locking means can involve some difficulty. Commonly a hole is provided in a piston of the spring support and there is another hole in a body of the spring support with which it has to be aligned, by linear and possibly also angular relative movement of the piston and body, to receive a key which locks the piston and body together, and thereby locks the spring means. In addition to the aforementioned difficulties, the provision of the holes to receive the key, and of the key itself, requires precision in manufacture which complicates the manufacture.

The primary object of the present invention is to provide a spring support in which compression spring means located in a body of the support and having carrier means connected to it adapted to be engaged with a load, such as a pipe, to connect the load to the spring means to be supported thereby, can be locked against movement relative to the body in a plurality of positions longitudinally of a longitudinal axis of operating movement of the spring means.

As the spring means can be locked in more than one position it can be more easily and quickly locked against movement than previously. Preferably the spring means is arranged to be locked in an infinite number of positions within the operating range of its longitudinal movement. Thus the spring means may be locked in a desired cold load set position before the spring support is installed for use, and when the spring support is installed and the spring means has been released, the spring means may subsequently be locked in whatever longitudinal position of use it has been occupying. Therefore, movement of the spring means to another position before it can be locked is unnecessary and hence locking is considerably facilitated.

The spring means may have an associated component which is longitudinally movable with the spring means relative to a bolt, stud or like elongated externally threaded member fixed to the body of the spring support and carrying nuts which can be moved between released positions in which they are spaced from the component and leave it free to move longitudinally relative to the threaded member, and locking positions in which they are tightened against the component to prevent it from moving relative to the threaded member, and thereby lock the spring means against longitudinal movement. The component may have parts which are diametrically opposed with respect to the longitudinal axis of movement of the spring means, and there may be two threaded members which are also located at diametrically opposite sides of the said longitudinal axis adjacent to the parts of the component and each carry nuts for tightening against the respective parts.

In an alternative arrangement a threaded member or members may be longitudinally movable with the spring means relative to a fixed part of the body and carry nuts which can be moved between released positions in which they are spaced from the fixed part and leave the threaded member free to move longitudinally relative to the fixed part and locking positions in which they are tightened against the fixed part to prevent the threaded member or members from moving relative to the fixed part, and so lock the spring means against longitudinal movement.

The carrier means may be constructed to support a pipe or other load in suspension from the spring support, or to support a pipe or other load from beneath.

Preferably the body is able to accommodate the spring means in the free length state of the spring means. An advantage of this is that the spring means may be tested and calibrated when installed in the body and assembly of the spring support has been completed, rather than before final assembly of the body as has always been necessary in known spring supports.

Embodiments of the invention will now be described by way of example with reference to the accompanying drawings in which.

Figure 1:
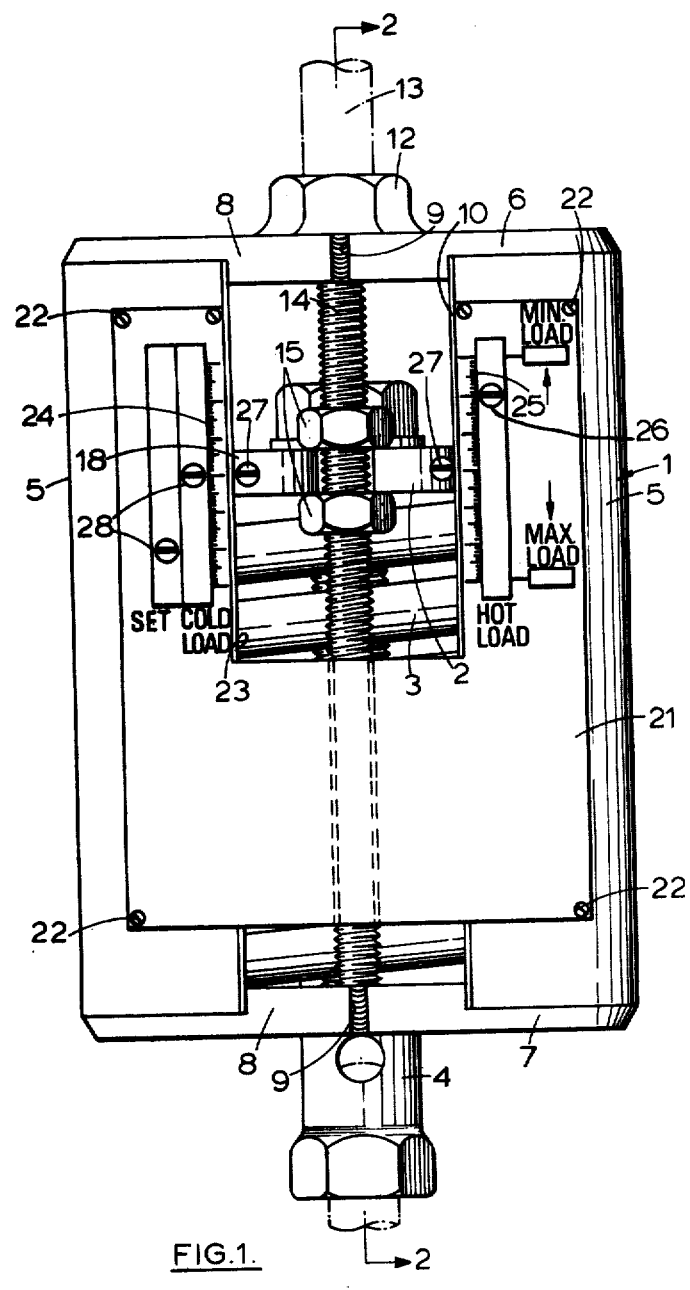
FIG. 1 is a front view of a variable load spring support in accordance with the invention for supporting a pipe in suspension.
Figure 2:
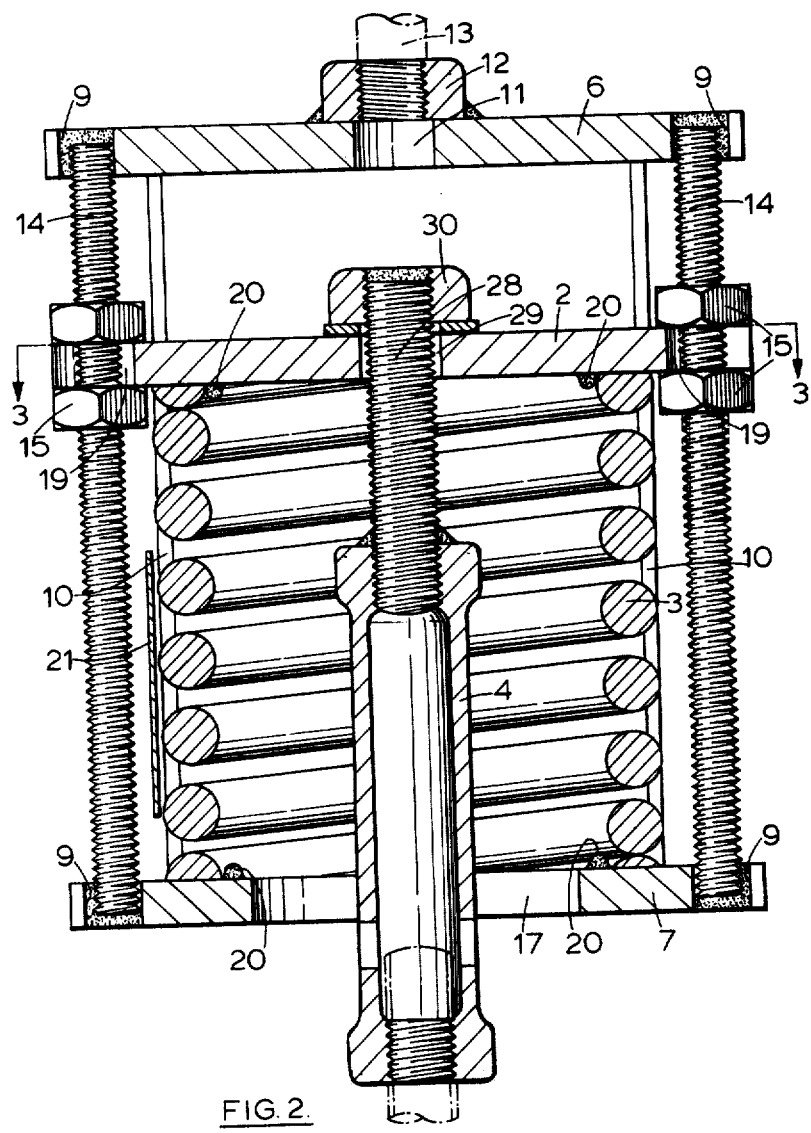
FIG. 2 is a vertical section on line 2—2 of FIG. 1.
Figure 3:
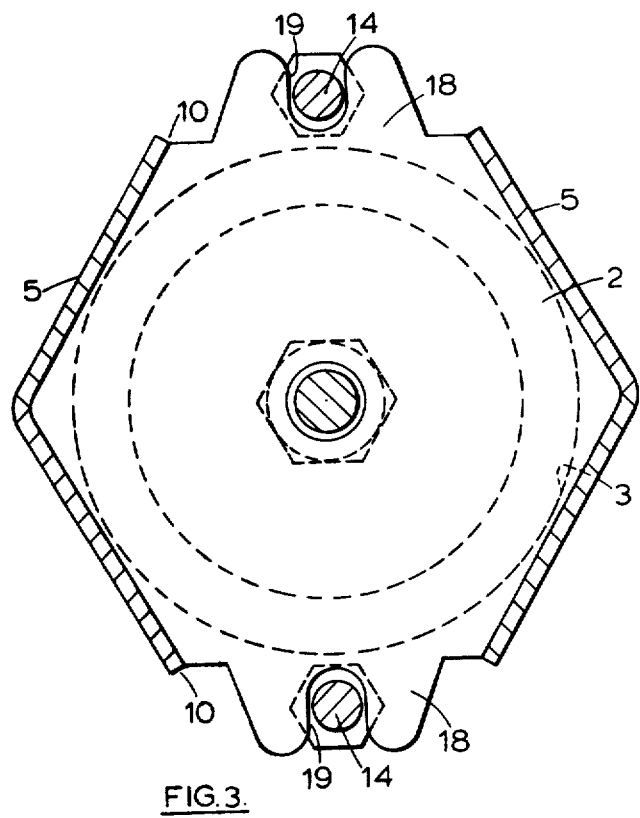
FIG. 3 is a horizontal section on line 3—3 of FIG. 2.

In the embodiment illustrated by FIGS. 1 to 3 the variable load spring support comprises a body 1, a piston 2 which is vertically movable in the body, a helical compression spring 3 in the body disposed with its longitudinal axis vertical, and a turnbuckle 4 suspended from the piston 2.

The body 1 is substantially rhomboidal, its longitudinal axis being vertical and co-axial with that of the spring 3 and the turnbuckle 4. The body comprises two opposed V-section, pressed metal, side wall members 5 which extend vertically between, and are welded to the peripheries of, two generally similar top and bottom plates 6 and 7 respectively. Each plate 6 and 7 is of rhomboidal shape with two laterally opposed projections 8 having banjo-shaped recesses 9 extending from their outer edges towards the central axis of the plate, the narrower portions of the recesses being adjacent the outer edges. The recesses 9 of the top plate are aligned with the respective recesses of the bottom plate. The side wall members 5 are disposed such that two similar vertically extending, opposed gaps 10 are left between them through which the projections 8 of the top and bottom plates protrude. The top plate 6 has a central plain-bore hole 11, and a nut 12 is welded to the upper surface of the plate co-axially with the hole to receive the lower end of a threaded sling rod 13 by which the spring support may be suspended from a beam or other anchorage in use. Alternatively an apertured lug, or a pair of apertured lugs, may be welded to the upper surface of the top plate for fastening to a clevis, bracket or other attachment. Extending between the top and bottom plates are two externally threaded members 14 which are welded at their opposite ends in the aligned recesses 9 of the projections 8 of the two plates. The threaded members are threaded throughout their lengths and each carries two hexagonal nuts 15 between the plates. The bottom plate 7 has a large concentric aperture 17 through which the turnbuckle 4 depends out of the body.

The rhomboidal form of body described and illustrated is preferred as it is relatively cheap and easy to manufacture. The body may take other forms if desired.

The piston 2 is a flat metal plate of generally similar shape to the top and bottom plates of the body with laterally opposed projections 18 which protrude through the gaps 10 and have deep U-shaped recesses 19 extending inwardly from the outer edges of the projections. The threaded members 14 pass through the recesses 19 with clearance. The nuts on each threaded member are disposed one above and the other below the piston. When the nuts of each threaded member are screwed to the opposite ends of the member the piston is free to move vertically in the body, its movement being guided by the radial projections 18 in the gaps 10. The extremities of the widest possible range of vertical movement of the piston are defined by the nuts in those positions. When the nuts are tightened against the piston, as shown in FIGS. 1 and 2, it is locked against movement in the body. It can be locked at any position between the extremities of the widest possible range of its vertical movement.

Spring 3 bears at its lower end on the bottom plate 7 and supports the piston at its upper end. Angularly spaced studs 20 welded to the bottom plate and piston engage inside the end coils of the spring and locate it co-axially in the body. It is possible to accommodate the spring in its free length state in the body if that should be required. An information plate 21 is secured to the side wall member 5 of the body by screws 22 and extends across one of the gaps 10. A central vertical slot 23 of similar width to the gap extends down the information plate 21 from its top edge. At either side of the slot 23 there are scales 24 and 25 on the information plate calibrated to show the deflection of the spring under a range of loads applied to the spring in use by supported pipes when cold and hot respectively. Screws 26 are applied to the information plate 21 with their kerfs horizontal to mark specific settings on the scales, and two screws 27 are applied to the projection 18 of the piston adjacent to the two scales, again with their kerfs horizontal, to serve as indicators.

An upper threaded element 28 of the turnbuckle 4 passes through a plain central hole 29 in the piston and is rigidly secured above the piston to a nut 30 which retains the turnbuckle to the piston whilst permitting it to turn relative to the piston. The nut also serves as a fulcrum about which the turnbuckle can swing, the large aperture 17 in the bottom plate 7 providing ample room for the turnbuckle to be able to swing. The facility for the turnbuckle to swing is desirable to accommodate any misalignment when the spring support is in use.

When the spring support is in use, the load exerted on the piston by a pipe through the turnbuckle is taken by the spring and the vertical position of the piston varies according to the load applied.

It will be understood from the foregoing that the piston, and hence the spring, can be readily locked in a required cold load set position prior to installation of the spring support for use, and when the support has been installed and the piston released to operate, the piston can also be readily locked in any vertical position it occupies in use whenever necessary, as for example for cleansing or hydraulic testing of the pipe supported by the spring support in use.

An advantage of the foregoing construction from a manufacturing point of view, is that the spring 3 may be assembled with the bottom plate 7 and piston 2, and the spring may also be compressed in that partial assembly and held compressed, before the top plate 6 and remaining parts of the spring support are added. For the partial assembly to be obtained the threaded members 14 are initially welded only to the projections 8 of the bottom plate. The partial assembly is effected in the following manner: the spring is located on the bottom plate; one of the nuts, if not already fitted, is applied to each threaded member; the piston is mounted on the spring and the second one of the nuts 15 is applied to each threaded member. The turnbuckle 4 may be connected to the piston before or after the piston is or has been mounted on the piston. A load may then be applied to the turnbuckle to cause the spring to be compressed and the nuts are tightened against the piston to retain the spring in the compressed state. The spring may be compressed to a required cold load position ready for use. The partial assembly may be left in that form until a complete spring support is required, when the plate is added and welded to the threaded members, the top plate having such fittings applied to it as are appropriate for the particular installation in which the spring support is to be used. The side wall members 5 of the body are welded to the top and bottom plates at this stage. It will be understood that a stock of partial assemblies may be built up from which complete spring supports can be readily made up as required. Hence manufacture and supply can be facilitated.

Figure 4:
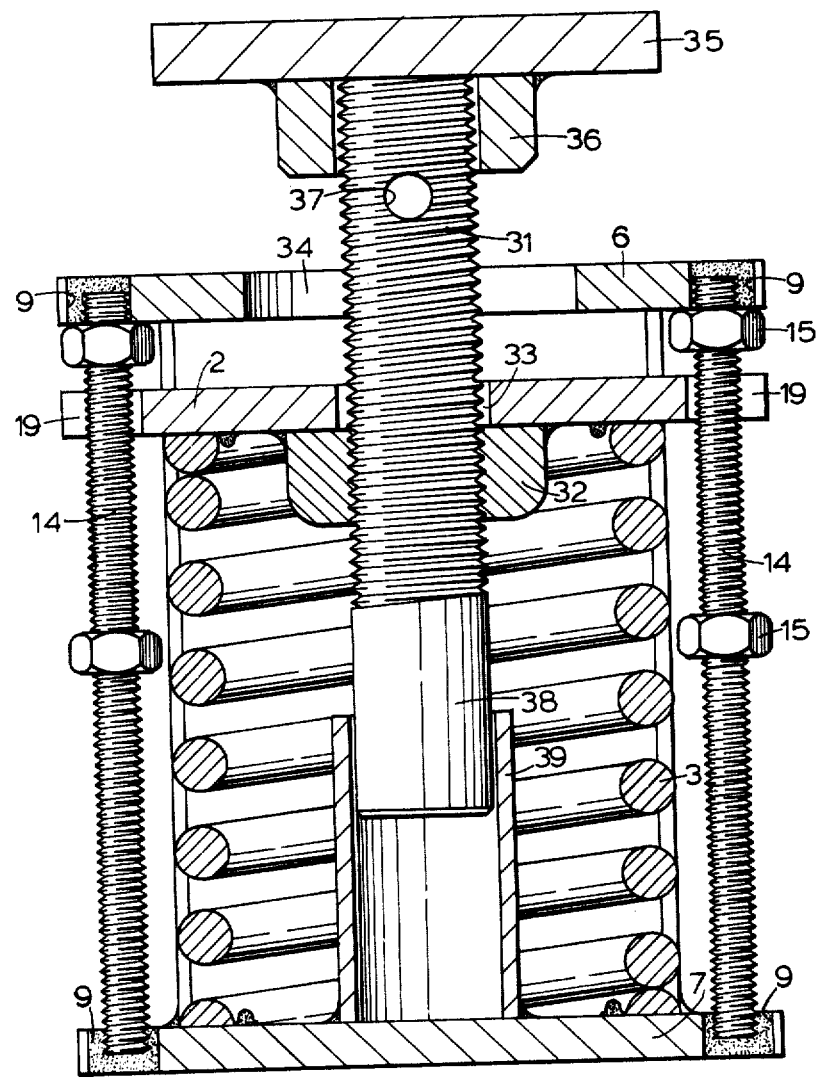
FIG. 4 is a vertical section through a second variable load spring support for supporting a pipe from below.

In the second embodiment shown in FIG. 4, parts which correspond to those in the first embodiment are indicated by the same reference numerals. The spring support is constructed to support a pipe from below. To this end the turnbuckle is replaced by a screw 31 which is threadedly engaged with a nut 32 fixed to the underside of the piston, extends vertically upwardly through a plain central hole 33 in the piston and a large co-axial hole 34 in the top plate, and has a load plate 35 rotatably located on its upper end by means of a collar 36 at the underside of the load plate. A pipe to be supported in use rests on the load plate. A diametral hole 37 in the screw 31 can receive a tommy bar for turning the screw to adjust it, and hence the load plate 35, vertically relative to the piston. At its lower end the screw has a plain cylindrical portion 38 which slidingly engages in a central upstanding guide tube 39 welded to the bottom plate. The piston can be locked in any position in its range of vertical movement in the same way as before.

It will be appreciated that in this last-described embodiment also partial assembly and pre-compression of the spring are possible.

Figure 5:
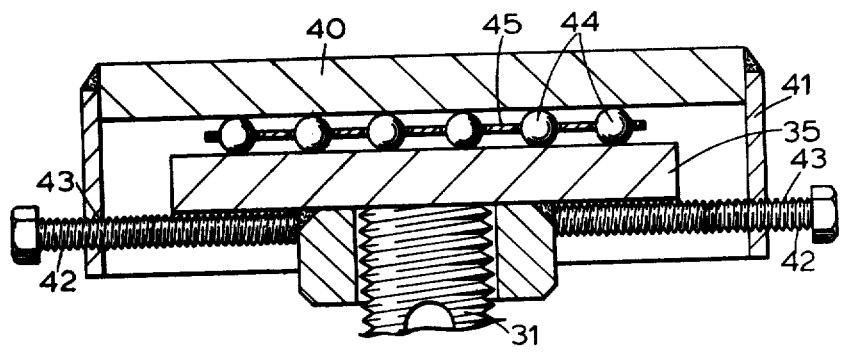
FIG. 5 is a fragmentary vertical section showing a modification to the spring support of FIG. 4.

The modification of the second embodiment shown in FIG. 5 comprises the addition of a floating platform 40 which is mounted on the load plate 35 to provide the seating for a pipe and can be laterally adjusted relative to the load plate. The platform 40 has a skirt 41 which surrounds the periphery of the load plate leaving a substantial space between it and the load plate. Angularly spaced set screws 42 threadedly engaged with holes 43 in the skirt extend radially with respect to the longitudinal axis of the screw 31 and engage underneath the load plate. The set screws 42 retain the platform to the load plate and the lateral position of the platform on the load plate is adjusted by means of them. Ball bearings 44 in a cage 45 are interposed between the platform and the load plate and they allow the platform to move easily relative to the load plate when its lateral position is being adjusted whilst supporting a load.

I claim:

1. A spring support comprising a body, compression spring means located in said body, carrier means connected to said spring means and constructed and arranged to be engaged with a load, such as a pipe, to connect the load to said spring means to be supported thereby, and locking means which acts between said spring means and said body for locking said spring means in an infinite number of longitudinal positions within an operating range of longitudinal movement of said spring means, said spring means having an associated component which is longitudinally movable with said spring means, and said locking means comprising an elongated externally threaded member and nuts engaged with said threaded member, said threaded member being fixed to said body and extending longitudinally of said spring means, said component having a part which freely co-operates with said threaded member, and said nuts being movable on said threaded member at opposite sides of said part between released positions in which they are spaced from said part and leave said component, and thereby said spring means, free to move longitudinally relative to said threaded member, and locking positions in which said nuts are tightened against said part to prevent said component from moving relative to said threaded member and thereby lock said spring means against longitudinal movement.

2. A spring support comprising a body, compression spring means located in said body, carrier means connected to said spring means and constructed and arranged to be engaged with a load, such as a pipe, to connect the load to said spring means to be supported thereby, and locking means which acts between said spring means and said body for locking said spring means in an infinite number of longitudinal positions within an operating range of longitudinal movement of said spring means, said spring means having an associated component which is longitudinally movable with said spring means and has parts projecting laterally of said spring means which are diametrically opposed with respect to the longitudinal axis of operating movement of said spring means, and said locking means comprising two elongated externally threaded members each of which has nuts engaged therewith, said threaded members being fixed to said body and extending alongside said spring means in the direction of longitudinal movement thereof at corresponding diametrically opposed positions to said projecting parts of said component, said projecting parts freely co-operating with said threaded members, and said nuts being movable on said threaded member at opposite sides of said projecting parts between released positions in which they are spaced from said projecting parts and leave said component, and thereby said spring means, free to move longitudinally relative to said threaded member, and locking positions in which said nuts are tightened against said projecting parts to prevent said component from moving relative to said threaded members and thereby lock said spring means against longitudinal movement.

3. A spring support according to claim 2 wherein said body has elongated gaps in its walls which extend in the direction of the longitudinal axis of operating movement of said spring means and through which said projecting parts extend laterally out of said body, and said threaded members are fixed to said body externally thereof opposite said gaps.

4. A spring support according to claim 3 wherein said body comprises two similar and opposed side wall members which are laterally spaced apart to define said gaps between them, and two end plates between and to which said side wall members are fixed, said end plates having portions projecting outwardly beyond said side wall members to which said threaded members are fixed.

5. A spring support according to claim 4 wherein said body is of rhomboidal form, said side wall members being of V-section and said end plates being of generally rhomboidal shape.

6. A spring support according to claim 3 wherein a scale of lineal measurements is provided on said body adjacent to and extending longitudinally of one of said gaps, and said projecting part at said one gap carries an indicator which registers with said scale to indicate the extent of deflection of said spring means under applied loads.

7. A spring support according to claim 2 wherein said carrier means comprises said component which is supported by said spring means at one end thereof, and connecting means attached to said component for connecting said component to a load to be supported by said spring means.

8. A spring support according to claim 7 wherein said connecting means comprises an elongate member which extends co-axially through said spring means and out of said body adjacent the opposite end of said spring means from said end at which said component is supported.

9. A spring support according to claim 8 wherein said member is attached to said component by a pivoted connection, and said body has an aperture through which said member projects out of said body and which permits said member to swing about said pivotal connection.

10. A spring support according to claim 7 wherein said connecting means comprises an elongate member which extends co-axially away from said spring means and out of said body adjacent to said one end of said spring means at which said component is supported.

11. A spring support according to claim 10 wherein a load plate is rotatably mounted on an end of said member remote from said component, said load plate being rotatable about the longitudinal axis of said member and providing a seat for a load to be supported.

12. A spring support according to claim 10 wherein a load plate is fixed at an end of said member remote from said component, and a floating platform is rotatably mounted on said load plate, said floating platform being rotatable about an axis extending in the direction of the longitudinal axis of said spring means and providing a seat for a load to be supported.

13. A spring support according to claim 10 wherein a guide is fixed to said body within said spring means and said member has a portion complementary to said guide slidingly engaged with said guide.

14. An assembly for a spring support, comprising compression spring means, first and second members engaged with opposite ends of said spring means, said first member being constructed and arranged for fixture as a part of a body of a spring support, said second member being constructed and arranged for connection thereto of carrier means for connecting a load, such as a pipe, to said second member, and said first and second members each having parts projecting laterally of said spring means which are diametrically opposed with respect to the longitudinal axis of operating movement of said spring means and said projecting parts of said second member having openings therein, and locking means comprising two elongated externally threaded members and pairs of nuts threadedly engaged with said threaded members, said threaded members being fixed to said projecting parts of said first member, extending alongside said spring means in the direction of longitudinal movement thereof and passing freely through said openings in said projecting parts of said second member, and said nuts being engaged with said threaded members at opposite sides of said projecting parts of said second member and being movable on said threaded members between released positions in which said nuts are spaced from said projecting parts and leave said second member, and thereby said spring means, free to move longitudinally relative to said threaded members, and locking positions in which said nuts are tightened against said projecting parts and prevent said second member from moving relative to said threaded members, thereby locking said spring means against longitudinal movement.

* * * * *